(12) United States Patent
Cook et al.

(10) Patent No.: US 7,190,473 B1
(45) Date of Patent: Mar. 13, 2007

(54) PRINTER APPARATUS WITH INTEGRATED GRAPHICAL USER INTERFACE AND METHOD FOR USING THE SAME

(76) Inventors: Sherry Anderson Cook, 2417 Brookshire Cir., Lexington, KY (US) 40515; Joseph Wade Luciano, 3512 Mildara Ct., Lexington, KY (US) 40515; John Anthony Moore, 6913 Roe St., Cincinnati, OH (US) 45227; Brandon Lynn Satanek, 3180 Stonecase Dr., Lexington, KY (US) 40509; James Alan Ward, 6392 KY Hwy. 419, Mayslick, KY (US) 41055

( * ) Notice: Subject to any disclaimer, the term of this patent is extended or adjusted under 35 U.S.C. 154(b) by 978 days.

(21) Appl. No.: 09/610,081

(22) Filed: Jul. 5, 2000

(51) Int. Cl.
*G06K 15/02* (2006.01)

(52) U.S. Cl. .................. 358/1.15; 715/700; 358/302

(58) Field of Classification Search .......... 358/1.1–1.9, 358/1.11–1.18, 296, 302; 715/700; 345/650, 345/661, 676
See application file for complete search history.

(56) References Cited

U.S. PATENT DOCUMENTS

| | | | |
|---|---|---|---|
| 2,977,407 A | 3/1961 | Hirsch | |
| 4,161,749 A | 7/1979 | Erlichman | |
| 4,270,853 A | 6/1981 | Hatada et al. | |
| 4,656,524 A | 4/1987 | Norris et al. | |
| 4,751,583 A * | 6/1988 | Levine | 358/256 |
| 4,827,347 A | 5/1989 | Bell | |
| 4,901,075 A | 2/1990 | Vogel | |
| 4,912,503 A | 3/1990 | Sawaki et al. | |
| 4,937,676 A | 6/1990 | Finelli et al. | |
| 4,967,266 A | 10/1990 | Yamamoto | |
| 5,032,911 A | 7/1991 | Takimoto | |
| 5,055,941 A | 10/1991 | Suzuki et al. | |
| 5,148,286 A | 9/1992 | Knodt et al. | |
| 5,383,035 A | 1/1995 | Suzuki | |
| 5,462,375 A | 10/1995 | Isobe et al. | |
| 5,465,133 A | 11/1995 | Aoki et al. | |
| 5,477,353 A | 12/1995 | Yamasaki | |
| 5,493,409 A | 2/1996 | Maeda et al. | |
| 5,499,052 A | 3/1996 | Nakanishi et al. | |
| 5,551,021 A | 8/1996 | Harada et al. | |
| 5,568,270 A * | 10/1996 | Endo | 358/298 |
| 5,587,740 A | 12/1996 | Brennan | |
| 5,659,823 A | 8/1997 | Mukai et al. | |
| 5,664,253 A | 9/1997 | Meyers | |
| 5,684,601 A * | 11/1997 | Endo | 358/298 |
| 5,706,104 A | 1/1998 | Sugiura et al. | |

(Continued)

OTHER PUBLICATIONS

Microsoft Press Computer Dictionary, 1997, Microsoft Press, Third edition, p. 220.*

(Continued)

*Primary Examiner*—King Y. Poon

(57) ABSTRACT

A stand-alone printing apparatus for transferring one or more digital photographs captured by a digital device to a printable medium. The printing apparatus includes an input member for receiving the digital photographs from a source and image processing for generating an image corresponding to each of the digital photographs. A graphical user interface with video display is integrated within the printing apparatus and includes a plurality of different states in which to preview the digital photograph images, select photographs for printing, and preview a printed page of selected photographs.

13 Claims, 15 Drawing Sheets

U.S. PATENT DOCUMENTS

| | | | |
|---|---|---|---|
| 5,715,234 A | 2/1998 | Stephenson et al. | |
| 5,715,486 A | 2/1998 | Kim et al. | |
| 5,715,492 A | 2/1998 | Stephenson | |
| 5,715,493 A | 2/1998 | Stephenson | |
| 5,734,940 A | 3/1998 | Iwane et al. | |
| 5,742,853 A | 4/1998 | Haga et al. | |
| 5,742,861 A | 4/1998 | Stephenson | |
| 5,752,109 A | 5/1998 | Saito et al. | |
| 5,752,114 A | 5/1998 | Saito et al. | |
| 5,757,388 A | 5/1998 | Stephenson | |
| 5,778,265 A | 7/1998 | Seki | |
| 5,784,657 A | 7/1998 | Manabe | |
| 5,796,428 A * | 8/1998 | Matsumoto et al. | 348/231 |
| 5,802,413 A | 9/1998 | Stephenson | |
| 5,819,126 A * | 10/1998 | Kitagawa et al. | 396/319 |
| 5,822,637 A | 10/1998 | Stephenson | |
| 5,835,809 A | 11/1998 | Stephenson et al. | |
| 5,841,517 A | 11/1998 | Tanibata | |
| 5,844,689 A | 12/1998 | Kawase | |
| 5,847,848 A | 12/1998 | Suzuki et al. | |
| 5,860,036 A | 1/1999 | Stephenson | |
| 5,894,326 A | 4/1999 | McIntyre et al. | |
| 5,909,248 A | 6/1999 | Stephenson | |
| 5,914,793 A | 6/1999 | Suzuki et al. | |
| 5,917,548 A | 6/1999 | McIntyre | |
| 5,937,232 A | 8/1999 | Taguchi et al. | |
| 5,940,169 A | 8/1999 | Masutani | |
| 5,946,031 A | 8/1999 | Douglas | |
| 5,949,469 A | 9/1999 | Stephenson | |
| 5,963,939 A * | 10/1999 | McCann et al. | 707/4 |
| 5,970,215 A | 10/1999 | Stephenson | |
| 5,973,734 A | 10/1999 | Anderson | |
| 5,980,010 A | 11/1999 | Stephenson | |
| 5,984,445 A | 11/1999 | Morita et al. | |
| 5,999,203 A | 12/1999 | Cane et al. | |
| 6,006,042 A | 12/1999 | Saito et al. | |
| 6,016,157 A | 1/2000 | Stephenson | |
| 6,035,143 A | 3/2000 | Saito et al. | |
| 6,091,909 A | 7/2000 | McIntyre et al. | |
| 6,094,282 A | 7/2000 | Hoda et al. | |
| 6,208,770 B1 | 3/2001 | Gilman et al. | |
| 6,356,357 B1 | 3/2002 | Anderson et al. | 358/1.17 |
| 6,504,960 B2 | 1/2003 | Takahashi | 382/305 |
| 6,552,743 B1 | 4/2003 | Rissman | 348/207.2 |
| 6,618,553 B1 | 9/2003 | Shiohara | |

OTHER PUBLICATIONS

Lexmark, "Lexmark Photo Jetprinter 5770, Jan. 12, 2000,".
Kodak, "Kodak PM 100 by Lexmark, Jan. 12, 2000,".
Hewlett Packard, "HP PhotoSmart P1000 Printer, Product Overview, Data Sheet, Feb. 23, 2000,".
Hewlett Packard, "Hewlett Packard, Brochure, PhotoSmart P1000/P1100 Printers, Jul. 1999,".
Hewlett Packard, "Hewlett Packard, Brochure, HP PhotoSmart P1000/P1100 Printers, Jul. 1999,".
Canon, "Canon, PowerShot A50, Brochure, Japan,".
Epson, "Epson (Color Imaging), Super Colario Photo CP-800, Brochure, Japan, Jun. 29, 1999,".
Epson, "Epson (Color Imaging), printon, Full-Auto AI Photo Processor, Brochure, Japan, May 5, 1999,".
Fuji, "Fujifilm (I & I—Imaging & Information), Digital Printer TX-70, Brochure, Japan, Oct. 1998,".
Fuji, "Fujifilm (I & I—Imaging & Information), Digital Camera FinePix 1500, Brochure, Japan, Jun. 1999,".
Fuji, "Fujifilm (I & I—Imaging & Information), Digital Camera, FinePix 2900z, Brochure, Japan, Jul. 1999,".
Kodak, "Kodak, DC240 Zoom, Brochure, Japan, Apr. 1999,".
Kodak, "Kodak, DC280J Zoom, Brochure, Japan, Jul. 1999,".
Konica, "Konica, Q-M200, Brochure, Japan,".
Nikon, "Nikon, CoolPix950—CoolPix700, Brochure, Japan, May 21, 1999,".
Olympus, "Olympus, CAMEDIA P-330, Brochure, Japan,".
Olympus, "Olympus, CAMEDIA C-900Zoom, C-830L, P-330, Brochure, Japan,".
Olympus, "Olympus, CAMEDIA C-2000ZOOM, Brochure, Japan,".
Panasonic, "Panasonic, COOLSHOTIIMega LK-RQ1302, Brochure, Japan, Jun. 1999,".
Ricoh, "Ricoh, RDC-5000, Brochure, Japan,".
Sanyo, "Sanyo, LCD Digital Camera DSC-X110, Brochure, Japan, Feb. 1999,".
Sony, "Sony, Digital Photo DPP-MS300, Brochure, Japan, Mar. 1999,".
Sony, "Sony, Cyber-shot Digital Still Camera DSC-F55K, Brochure, Japan, Jun. 1999,".
Toshiba, "Toshiba, Digital Still Camera, Allretto M4, Brochure, Japan,".

* cited by examiner

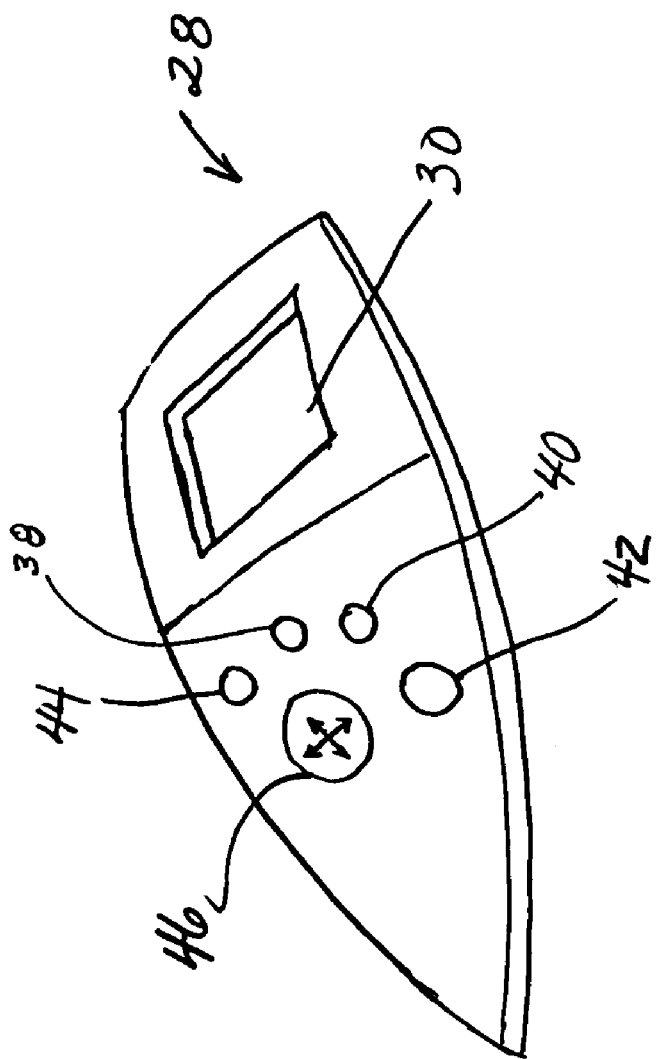

PRINTER APPARATUS WITH INTEGRATED GRAPHICAL USER INTERFACE AND METHOD FOR USING THE SAME

TECHNICAL FIELD

The present invention relates to the field of printer apparatuses and methods for using the same and, more particularly, to the field of stand-alone printer apparatuses which are adapted to print digital photographs.

BACKGROUND OF THE INVENTION

Devices which can capture and digitally store an image on a flash memory card are becoming more commonplace as the cost of these devices and their attendant memory cards continues to decrease. In addition, devices such as digital cameras and scanners are becoming more popular as the resolution of the images captured by these devices continues to improve and approach the quality of traditional film photography. However, in order to obtain a "picture" from these devices, it is still necessary to process and print the captured digital images. The processing and printing of digital images can include transferring graphic files from a memory, such as a flash memory card, to a computer, and the subsequent printing of the images from the computer.

Traditionally, a computer was connected via a parallel port to a printer, with the printer being driven by the computer to print selected images. In this scenario, editing and manipulation of the digital images was achieved via software processed by the computer. Subsequently, stand-alone printers were developed which enabled the digital images to be input directly to the printer via flash memory cards, and manipulated and printed directly through the printer. An exemplary stand-alone photoprinter is shown and disclosed in a patent application entitled "Printer Apparatuses And Methods For Using The Same" and having Ser. No. 09/164,500, filed on Oct. 1, 1998, which is owned by the assignee of the present invention and is hereby incorporated by reference. With this printer, each image on an input memory card is assigned a photo number, and a thumbnail depiction of all the images and assigned photo numbers is printed to facilitate selection of the desired image. After the desired image is selected, the appropriate photo number is designated via a two line by sixteen character liquid crystal display or "LCD" using activating buttons located on an operator panel. After a photo number is entered to select an image, the image may be formatted such as, for example, by cropping, adding text, or framing the image. The image is formatted by selecting from amongst a series of menu options which are depicted alphanumerically on the LCD display. After the options are entered, the formatted image is transferred to a printable medium by activating a print button on the operator panel.

While stand-alone photoprinters are beneficial in that they enable the printing of digitally captured images without a general purpose computer, one drawback is that they do not provide for viewing the selected, formatted image prior to printing. Thus, the user has to wait several minutes for a printed copy of the image before determining whether the image was formatted correctly, or even whether the correct image was selected. If the image is incorrect, the user must select again, or reformat the same image and print a new copy. This repeated printing of images in an effort to obtain the correct one wastes ink and paper.

Another drawback with existing stand-alone printers is that the wide variety of complex formatting options available to the user can become confusing when working with only a two line by sixteen character text display. In particular, to format an image a user must often move between multiple menu levels and settings within each level. With only a small text display, it is easy for a user to become disoriented and lose track of all of the available options and the current position within the menu structure.

It is known to attach an external display device such as a video monitor or television screen to a printer in order to view digitally captured images prior to printing. It is also known to connect a printer to a digital camera in order to view images on the camera display prior to printing. However, such arrangements add to the complexity of the printing process since additional hardware and communication links are required to transfer the image from the printer to the external monitor. Further, the use of a separate video monitor for viewing images inhibits the portability of the printer.

Accordingly, it is desirable to have a stand-alone printing apparatus which includes an integrated graphical user interface display for previewing selected and formatted images prior to printing. Further, it is desirable to have such a stand-alone printing apparatus which facilitates the interactive viewing and editing of digitally derived images and output pages prior to printing. In addition, it is desirable to have such a stand-alone printing apparatus in which complex formatting functions are arranged in a user-friendly fashion.

SUMMARY OF THE INVENTION

Accordingly, it is an object of the present invention to provide an improved stand-alone printer.

In particular, it is a benefit of the present invention to provide an improved stand-alone printing apparatus, and method for using the same, in which a graphical user interface display is integrated within the printing apparatus for previewing images prior to printing.

It is another benefit of the present invention to provide a stand-alone printing apparatus which enables the previewing of both images and printed pages.

It is yet another benefit of the present invention to provide a graphical user interface for a stand-alone printer in which a menu of options and settings may be shown with an image on an integrated video display.

It is a further benefit of the present invention to provide an integrated graphical user interface for a stand-alone printer in which a user is able to easily navigate between an image display and a page display.

It is yet a further benefit of the present invention to provide a stand-alone printer in which individual images may be previewed on an integrated graphical display, and displayed images may be immediately printed by activation of a button on an operator panel.

Still another benefit of the present invention is to provide a stand-alone printing apparatus for previewing and printing digital images input directly from a computer readable medium.

A still further benefit of the present invention is to provide a stand-alone printing apparatus in which images and printed pages may be previewed simultaneously on an integrated graphical display.

Additional objects and other novel features of the invention will be set forth in part in the description that follows, and in part will become apparent to those skilled in the art upon examination of the following or may be learned with the practice of the invention.

To achieve the foregoing and other advantages, and in accordance with one aspect of the present invention, a stand-alone printing apparatus for transferring one or more digital photographs captured by a digital device to a printable medium is provided having an input member for receiving the digital photographs from a source and image processing for generating an image corresponding to each of the digital photographs. A graphical user interface with video display is integrated within the printing apparatus and includes a plurality of different states in which to preview the digital photograph images, select photographs for printing, and preview a printed page of selected photographs. An image or printed page may be formatted, and the preview on the video display updated to reflect the formatting. A print control is provided in the printing apparatus for producing on the printable medium a pattern associated with an image or a page of selected photographs.

In another aspect, the present invention provides a graphical user interface for a stand-alone photoprinter capable of transferring a digital photograph from a source to a printable medium. The user interface includes a video display integrated within the photoprinter for graphically depicting an image corresponding to the digital photograph, and a plurality of activating members for initiating user instructions to the interface. The user interface further includes a plurality of different states for depicting information on the video display, with one of the states being active at a time. The user interface moves between the active states in response to activation of one or more activating members.

The present invention also provides a method for previewing and printing digital photographs on a stand-alone photoprinter which includes the steps of receiving digital photographs from a source, generating an image for each of the photographs in an image processing member, and providing a user interface having a video display integrated within the photoprinter. An image view in the user interface is activated to display the photographic images on the video display, and individual images may be selected from the displayed images to form a printed page. A page view in the user interface may be activated to preview the printed page on the display, following which a print control may be instructed to produce a pattern associated with the printed page on a print medium.

Still other objects of the present invention will become apparent to those skilled in this art from the following description wherein there is shown and described preferred embodiments of this invention, including a best mode currently contemplated for the invention, simply for the purposes of illustration. As will be realized, the invention is capable of other different aspects and embodiments without departing from the scope of the invention.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 5 is an enlarged view of an operator panel for the photoprinter of FIG. 3 for a first exemplary embodiment;

DETAILED DESCRIPTION OF THE PREFERRED EMBODIMENTS

Reference will now be made in detail to the present preferred embodiments of the invention, examples of which are illustrated in the accompanying drawings, wherein like numerals indicate the same elements throughout the views. As will be appreciated, the present invention, in its most preferred form, is directed to a stand-alone printer which is capable of printing images captured by a digital device, such as a camera or scanner, and which includes integrated graphical display capabilities for previewing and formatting these images.

Figure 1:
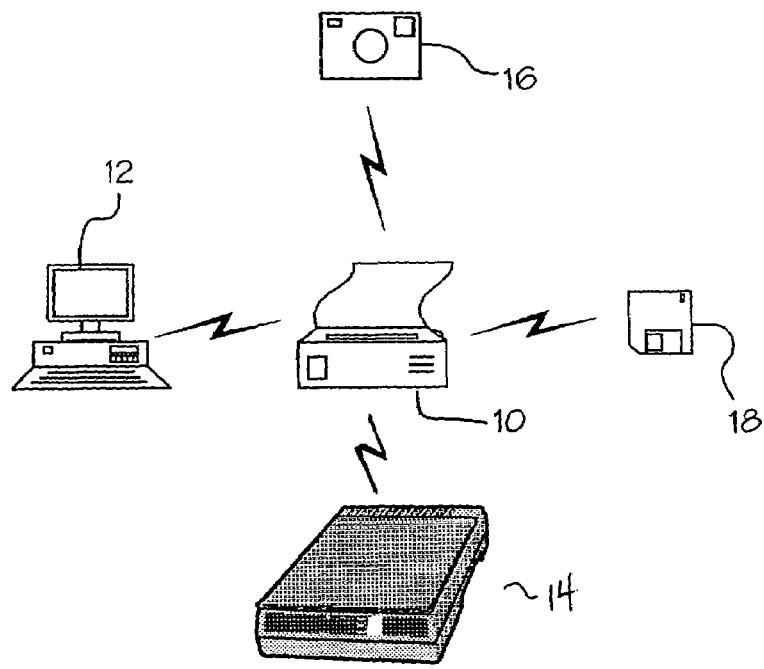
FIG. 1 is a view of a photoprinter communicating with a variety of external components.

FIG. 1 illustrates one embodiment of a stand-alone photoprinter 10. As used herein, a "photoprinter" refers to a stand-alone appliance for printing digital photographs onto a printable medium. A "digital photograph" is a photographic image captured by a light sensing electronic device (e.g., CCD, CMOS, CID, or the like) and converted into a digital file capable of being stored on a computer readable medium. The term "stand-alone" means that the printer is capable of processing and printing digital files independent of an external host device, such as a computer, wherein "processing" means calculating a pixel pattern to be printed on the printable medium that represents the corresponding digital file (sometimes referred to as "ripping" or generating printing code). For instance, a printer is considered stand-alone if an external device merely passes a digital photograph to the printer and the printer contains the logic for processing and printing the digital photograph. The foregoing definitions are inclusive and open-ended. For example, a stand-alone printer may additionally be capable of receiving printing code from an external device. As a further example, a photoprinter may additionally be capable of processing and printing digital files other than digital photographs, such as text files, word processing files, HTML files, and the like.

The photoprinter 10 is operative to print digital photographs on printable media (e.g., paper, glossy film or photo paper, index cards, labels, envelopes, transparencies, coated paper, cloth, etc.). In one preferred embodiment, the photoprinter 10 works by transferring an ink (e.g., toner, dye, pigment, wax, carbon, etc.) onto a printable medium. For instance, the photoprinter 10 can employ conventional thermal ink jet technology, however, it is contemplated that the present invention can be adapted for use with other types of ink jet technologies, such as piezo ink jet. In addition, the present invention can be adapted for use with other printer technologies, such as electrophotography, dye diffusion, thermal transfer, and the like.

While the photoprinter 10 operates as a stand-alone printer, it can nevertheless communicate with a variety of external components, only a portion of which are illustrated in FIG. 1. In the present example, the photoprinter 10 can communicate with a computer 12 using any one of a variety of different communication links, such as parallel cables, serial cables, telephone lines, universal serial bus port "USB", an IEEE-1394, BLUETOOTH, fiber optics, infrared "IR", radio frequency "RF", network interface cards (e.g., Ethernet, token ring, etc.), and the like. The computer 12 can be any conventional or special purpose computer, such as a desktop computer, a tower computer, a micro-computer, a mini-computer, server, workstation, palmtop computer, notebook computer, or the like. Through the communication link, the photoprinter 10 can receive digital photographs from the computer 12 for processing and printing. In one embodiment, the computer 12 is programmed to generate printing code (e.g., via locally loaded print drivers) and the photoprinter 10 is capable of receiving the externally processed printing code for direct printing. As such, the photoprinter 10 would have dual functionality: a stand-alone printer as well as a more conventional printer for receiving commands from an external device.

The photoprinter 10 also can communicate with a digital camera 16 using an appropriate communication link. Typically, a digital camera 16 includes one or more lenses that focus light into an image on a light sensing electronic device, and stores the image as a digital photograph. In one embodiment, the photoprinter 10 can retrieve, process and print digital photographs stored in the camera 16.

The photoprinter 10 can also communicate with a computer readable medium 18, shown here as a floppy diskette. A computer readable medium stores information readable by a computer, such as programs, data files, etc. As one with ordinary skill in the art will readily appreciate, a computer readable medium can take a variety of forms, including magnetic storage (such as hard drives, floppy diskettes, tape, etc.), optical storage (such as laser disks, compact disks, digital video disks "DVD", etc.), electronic storage (such as random access memory "RAM", read only memory "ROM", programmable read only memory "PROM", flash memory, memory sticks, etc.), and the like. Some types of computer readable media, which are sometimes described as being non-volatile, can retain data in the absence of power so that the information is available when power is restored.

The photoprinter 10 preferably interfaces with the computer readable medium 18 using an internal or external drive. As used herein, the term "drive" is intended to mean a structure which is capable of interfacing with (e.g., reading from and/or writing to) a computer readable medium. Naturally, suitable drives will vary depending upon the specific computer readable medium 18 being employed. In preferred embodiments, the photoprinter 10 includes first and second drives each adapted to receive a solid state flash memory card. The first and second drives are preferably both internal drives. Flash memory cards, due to their very small size and light weight, are a highly portable computer readable medium which are electrically re-writable and are non-volatile. More preferably, the first and second drives are adapted to receive different types of flash memory cards, such as a NAND type of flash memory card (e.g., a SmartMedia™ card developed by Toshiba, Inc.) or a PCMCIA type of flash memory card (e.g., the CompactFlash™ developed by SanDisk, Inc.).

As shown in FIG. 1, the photoprinter 10 can also communicate with a scanning device 14 through an appropriate communication link. The scanning device may be any type of conventional or special purpose scanner which transfers an image from a photographic film media to a digital format.

Figure 2:
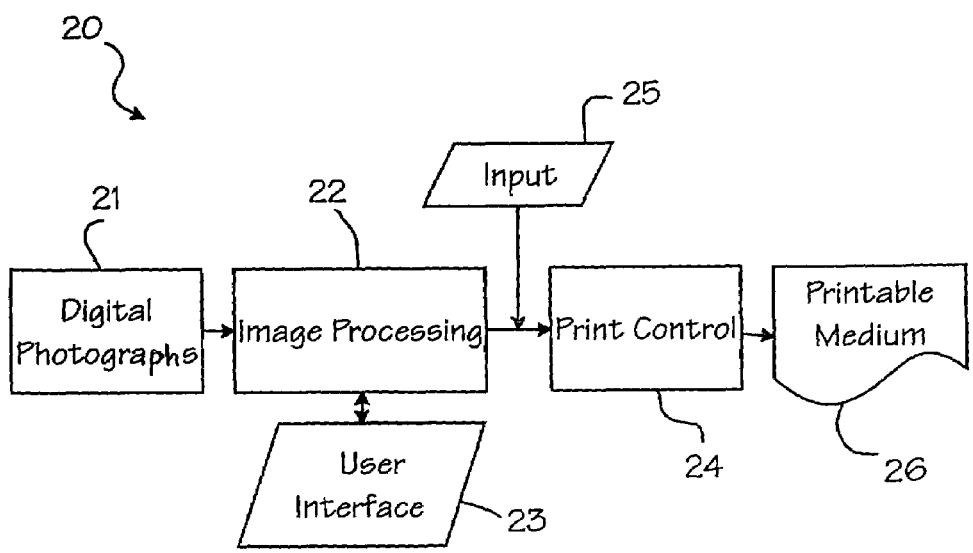
FIG. 2 is an operational block diagram of the photoprinter of FIG. 1.

FIG. 2 depicts a preferred operational block diagram 20 for the photoprinter 10. One or more digital photographs 21 are input to the image processing block 22, located internal to the photoprinter 10. The digital photographs 21 can be received by an input member from a variety of different sources, whether internal to the photoprinter 10 or from an external source via a drive, communications link, or the like. Furthermore, the digital photographs 21 can take any one of a variety of different file formats, whether raster, vector, or other format (e.g., GIF, TIFF, PCX, JPEG, EXIF, CIFF, JFIF, etc.).

The image processing block 22 is responsible for calculating a pixel pattern to be printed on the printable medium 26 that represents the corresponding digital photograph 21, sometimes referred to in the art as generating printing code. The image processing block 22 may optionally enhance the digital photographs 21. For instance, photo enhancement software, such as the PICTURE IQ software by Digital Intelligence, may be incorporated into the image processing 22. Further, image processing 22 may optionally include a variety of different resources to modify the printed rendition of the digital photographs 21, such as the addition of text, frames, templates, scaling, etc. Enhancements or resources may be implemented before and/or after the digital photographs 21 are converted to printing code.

A user interface 23 is provided as a portion of the controlling software in the photoprinter 10 to allow a user to interact with and/or direct the image processing block 22 (e.g., controlling the enhancements and/or resources). In the present invention, the user interface 23 includes an integrated video display for previewing digital photographs 21, and one or more buttons or other input devices for modifying the displayed image and printing pages, as will be described in more detail below.

The print code generated during image processing 22 is passed to the print control 24. In the cases where printing code is generated from an external source (e.g., computer 12), such printing code can be input 25 directly to the print control 24, thus bypassing the image processing block 22. The print control 24 is responsible for directing the physical transference of the pixel pattern represented by the printing code to the printable medium 26. The photoprinter 10 is preferably in the form of a thermal ink jet printer having one or more conventional thermal ink jet print heads. During printing, the print control 24 directs one or more motors to move the printable medium 26 longitudinally relative to the photoprinter 10 so that it is properly positioned for deposition of an ink pattern or swath. Once the printable medium 26 is in position, the print control 24 directs the print head to move along a conventional print head carriage in a direction transverse to the longitudinal direction while firing droplets of ink onto the surface of the printable medium 26.

The print head may make one or more of these transverse passes to complete printing for the swath. After the swath is complete, the printable medium's 26 position is adjusted longitudinally for the printing of the next swath.

Figure 3:
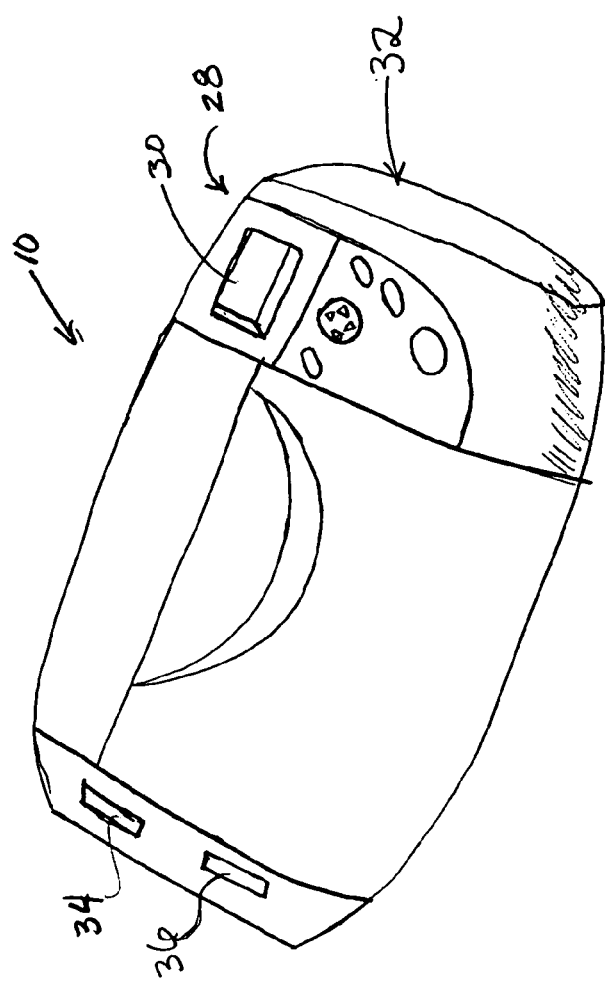
FIG. 3 is a front perspective view of an exemplary photoprinter in accordance with the present invention.

Referring now to FIG. 3, the photoprinter 10 also includes an operator panel, designated generally by the reference numeral 28, which is controlled by the user interface 23. The operator panel 28 includes a number of activating buttons for initiating user instructions to image processing 22, as well as a graphical display for previewing digital photographs or images. The operator panel 28 may be rotatably affixed to a housing 32 of the photoprinter 10, such that the panel at its lowermost position is at approximately a 20 degree slope from horizontal with respect to the housing, and may rotate approximately an additional 30 degrees vertically to allow the display to be positioned by a user to a preferred viewing angle. The graphical display is preferably a color liquid-crystal display or "LCD" 30. Examples of suitable color LCD's include 1.8 inch diagonal displays with 312×230 color dot resolution or 160×234 color (or RGB) dot resolution, such as are commercially available and commonly used in consumer electronics. However, these particular color LCD's are only representative, and other color LCD's may be utilized in the present invention without departing from the scope of the invention. In addition, while the invention is described herein as utilizing a color LCD, it is contemplated that alternative forms of color display technology could become available which would also be suitable for use in the present invention. In addition to the operator panel 28, FIG. 3 depicts first and second drives 34, 36 for receiving computer readable medium. As mentioned above, the computer readable medium is preferably a solid state flash memory card 18 which is capable of storing digital photograph files.

Figure 4:
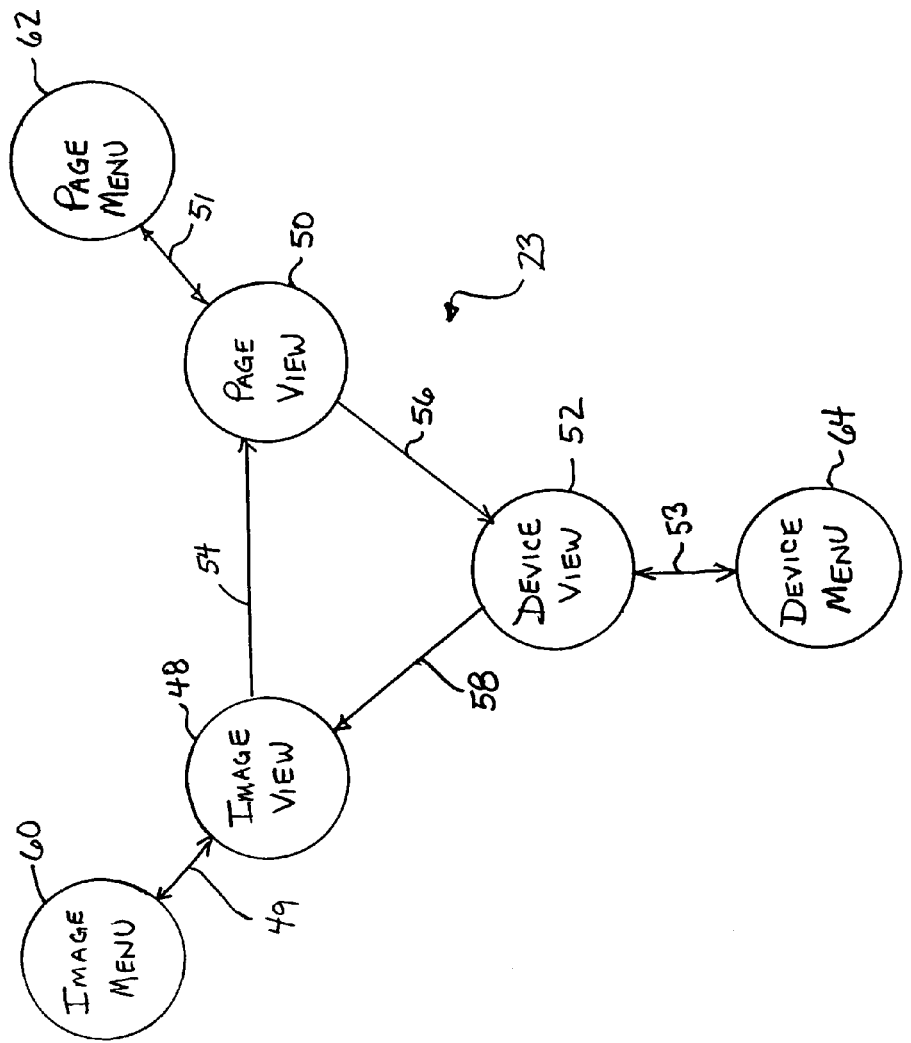
FIG. 4 is a diagrammatic illustration of a first exemplary embodiment of the user interface shown in FIG. 2.

Turning now to FIG. 4, which illustrates a first exemplary embodiment for the graphical user interface 23 of the present invention. As shown in FIG. 4, the graphical user interface 23 comprises a number of different primary states or "views" in which digital images and other information may be depicted on the display 30. At any given time during operation of the photoprinter 10, one of these states or views may be active on the display 30. The first of these states is an image view 48, in which the display 30 shows a preview of a single digital photograph 21 in either a formatted or unformatted version. The digital photograph 21 may be input to photoprinter 10 either from a computer readable medium in drives 34 or 36, or any other peripheral device attached to the photoprinter. The second view is a page view 50 in which the display 30 shows a preview of a page to be printed. The page will preferably have been constructed from digital photographs selected while the image view 48 is active. As shown in FIG. 4, the first exemplary embodiment also includes a third, "device" view 52 for setting operating parameters for the photoprinter 10 and any peripheral devices attached to the photoprinter. As mentioned above, the photoprinter 10 preferably includes a USB port, or another type of communication link, to enable the photoprinter to interface with and drive a number of different types of peripheral devices. In the device view 52, the various attached devices are preferably depicted by icons on display 30, and operating parameters are selected or set for controlling these peripheral devices. Preferably, photoprinter 10 will include software for detecting what devices are attached to the photoprinter at start-up, and configuring the device view 52 as appropriate for the devices.

FIG. 5 is an enlarged view of the operator panel 28 of FIG. 3 for the first exemplary user interface embodiment illustrated in FIG. 4. As shown in FIG. 5, in this embodiment the operator panel 28 includes a plurality of activating buttons for initiating instructions to the user interface 23, image processing 22 and print control 24. These activating buttons include a "view" button 38, a "select" button 40, a "print" button 42 and a "menu" button 44. In addition to these buttons, a four-way rocker switch 46 is provided for moving up, down, left and right between menu options and images depicted on the graphical display 30.

In the first embodiment, the view button 38 provides for navigation between the three different states, as indicated by lines 54, 56 and 58 in FIG. 4. In particular, pressing the view button 38 while the image view 48 is active will cause the active view to change to the page view 50, and the display 30 to change to reflect the page view as active, as indicated by arrow 54. Similarly, activation of the view button 38 while the page view 50 is active will cause the device view 52 to be active as indicated by arrow 56. Finally, activation of the view button 38 while in the device view 52 will cause the image view 48 to be active again as indicated by arrow 58.

As shown in FIG. 4, a menu of options is associated with each of the views 48, 50, and 52 for modifying, formatting or setting parameters for the particular image, page or device shown on the display 30. In particular, an image menu 60 of image-related functions (enhancements, modifications, etc) is associated with the image view 48. The image menu 60 may be selected by pressing the menu button 44 on the operator panel 28 when the image view 48 is active, as indicated by arrow 49. Likewise, a page menu 62 of page-related functions (page layout, copies, etc.) is associated with the page view 50, and may be selected by pressing the menu button 44 when the page view is active, as shown by arrow 51. A device menu 64 is also associated with the device view 52, and may be accessed by activating the menu button 44 when the device view is active, as shown by arrow 53. For each of the views 48, 50, and 52, pressing the menu button 44 causes the corresponding menu to overlay the existing display. For each of the menus 60, 62 and 64, particular options may be selected by pressing the select button 40 while the option is highlighted. Also, navigation between the options in each of the menus 60, 62 and 64 may be accomplished by pressing the up and down arrows on the rocker switch 46. Once in one of the menus 60, 62 and 64, the menu may be exited without any changes being made to the displayed image or settings by pressing the menu button 44 until the display returns to the main screen of the active view.

Figure 6A:
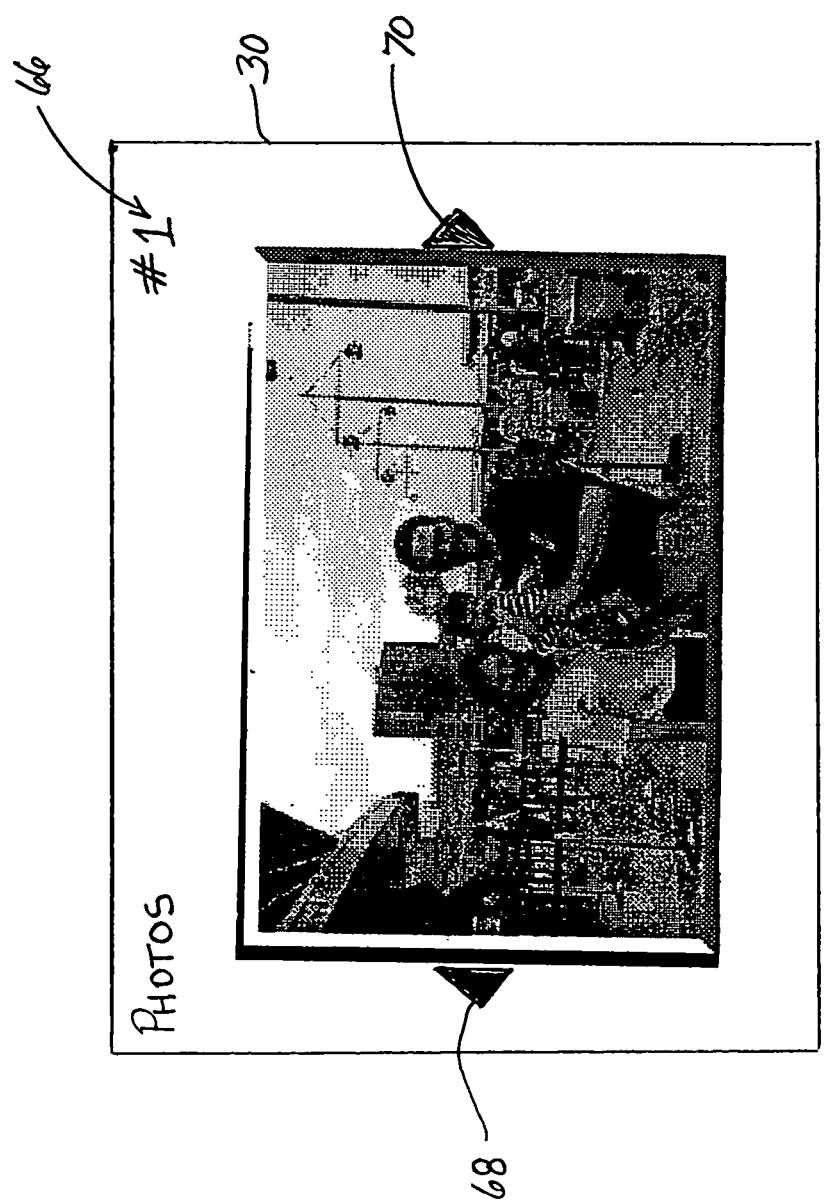
FIG. 6a is an exemplary screen display depicting a first, image view of the user interface of FIG. 5.
Figure 6B:
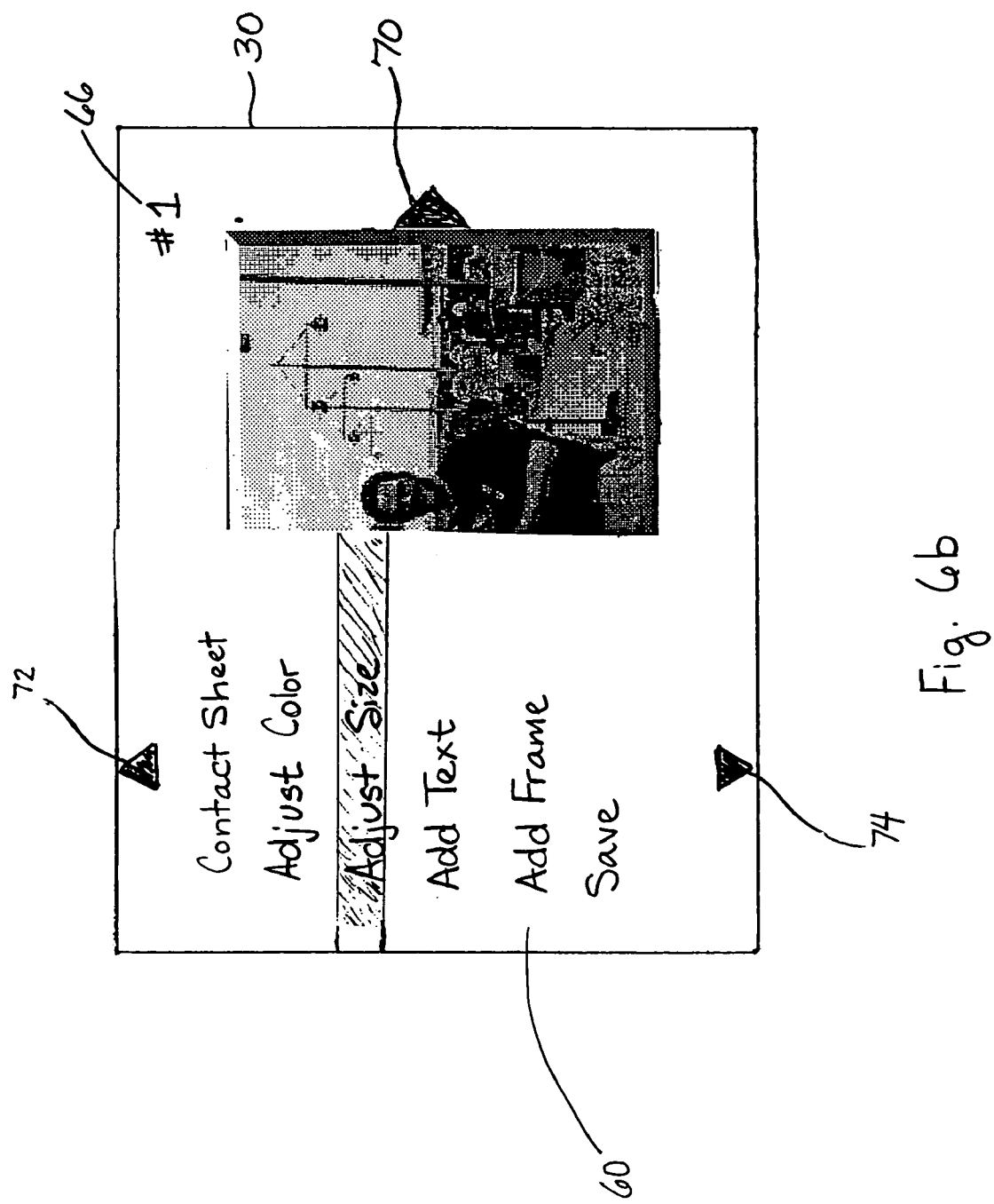
FIG. 6b is an exemplary screen display, similar to FIG. 6a, depicting the image view and accompanying menu.

The function of the "select" button 40 in operator panel 28 varies depending upon the active view and display. When the image view 48 is active, as shown in FIG. 6a, pressing the select button 40 will add (or remove) the displayed image from the output page being constructed. When the image menu 60 is selected while the image view is active, such as shown in FIG. 6b, pressing the select button 40 will cause the highlighted menu option to be selected. For example, as shown in FIG. 6b, pressing the select button 40 would cause the adjust size option to be selected. In the present invention, certain menu options may include imbedded submenus. For these menu options, highlighting and selecting the option will cause the corresponding submenu to overlay the previous menu on the display 30.

When either the page view 50 or the device view 52 is active, the select button 40 is disabled except when in a menu. When either the page or device menus 62 or 64 are active, the select button 40 will cause the highlighted menu option to be selected from the menus in the same manner as with the image menu 60.

When the image view 48 is active, pressing the "print" button 42 instructs image processing 22 to immediately print the image shown on the display 30 onto a printable medium 26. To print additional images, the left and right arrow keys on the rocker switch 46 may be pressed to display the next or previous images on the display 30. Once an additional desired image is displayed, the print button 42 is again pressed to immediately print the image. In this "immediate print" mode, the image is printed with any enhancements or modifications that were applied to the image using the image menu 60. In addition, a zoomed image may be printed by selecting a zoom factor from the menu options prior to pressing the print button 42. Alternatively, a zoom button may be provided on operator panel 28 for cycling the image through a series of zoom factors. When the page view 50 is active, pressing the print button 42 instructs image processing 22 to immediately print the page shown on the display 30. In the device view, the print button 42 is disabled.

FIG. 6a depicts an exemplary screen shown on display 30 when the image view 48 is active. As shown in FIG. 6a, when the image view 48 is active a single digital photographic image is displayed in full color on the graphical display 30. This photographic image may have been input to the photoprinter 10 from any of a number of peripheral devices or sources, such as, for example, those depicted in FIG. 1. As the digital photographs 21 are input to the photoprinter 10, each of the photographs is assigned a photo number. These numbers would typically be assigned in ascending order based upon the order in which the photographic files were received by image processing 22. These assigned photo numbers are displayed with the corresponding image, as shown at 66, to provide an easy means for the user to recall a particular image. Left and right arrows 68, 70 may also be depicted to indicate that additional images are available for viewing on the display 30. The user may navigate to these additional images by pressing the left arrow on the rocker switch 46 to move to the next previous image, or the right arrow on the rocker switch to move to the next subsequent image. In this manner, each of the photographs 21 from the source may be viewed in full color on the display 30 by utilizing the rocker switch 46 to step between the photographic images.

FIG. 6b depicts an exemplary screen shown on display 30 when the menu button 44 has been pressed while the image view 48 is active. As mentioned above, pressing the menu button 44 causes the menu corresponding to the active view to overlay the displayed image. As shown in FIG. 6b, the image menu 60 may include any number of options for formatting, modifying or enhancing the displayed image. In the exemplary embodiment shown, the image view menu 60 includes the options: "contact sheet", "adjust color", "adjust size", "add text", "add frame" and "save". These options are only representative of the menu options that may be utilized, with the particular options being determined by the application. In addition, the options may be changed by software updates input to the photoprinter 10 through a peripheral device, such as a software update from a computer or a computer readable medium disposed in drives 32 or 34. Accordingly, the depicted menu options will not be described in greater detail herein. When more menu options are available than can be shown on the display 30 at the same time, up and down arrows 72, 74 are depicted to indicate the additional options. The user may access these additional options by pressing either the up or down arrows on the rocker switch 46. After a menu option has been selected to format or otherwise modify the image, the display 30 is immediately updated to reflect the selection and display the modified image. Thus, a user can interactively modify and format an image by selecting a format option from the menu 60, and immediately viewing the effect of the selection on the image. The ability to interactively format and preview images decreases the time required to prepare an image for printing, and assures that the image is in the correct format prior to printing.

Figure 7A:
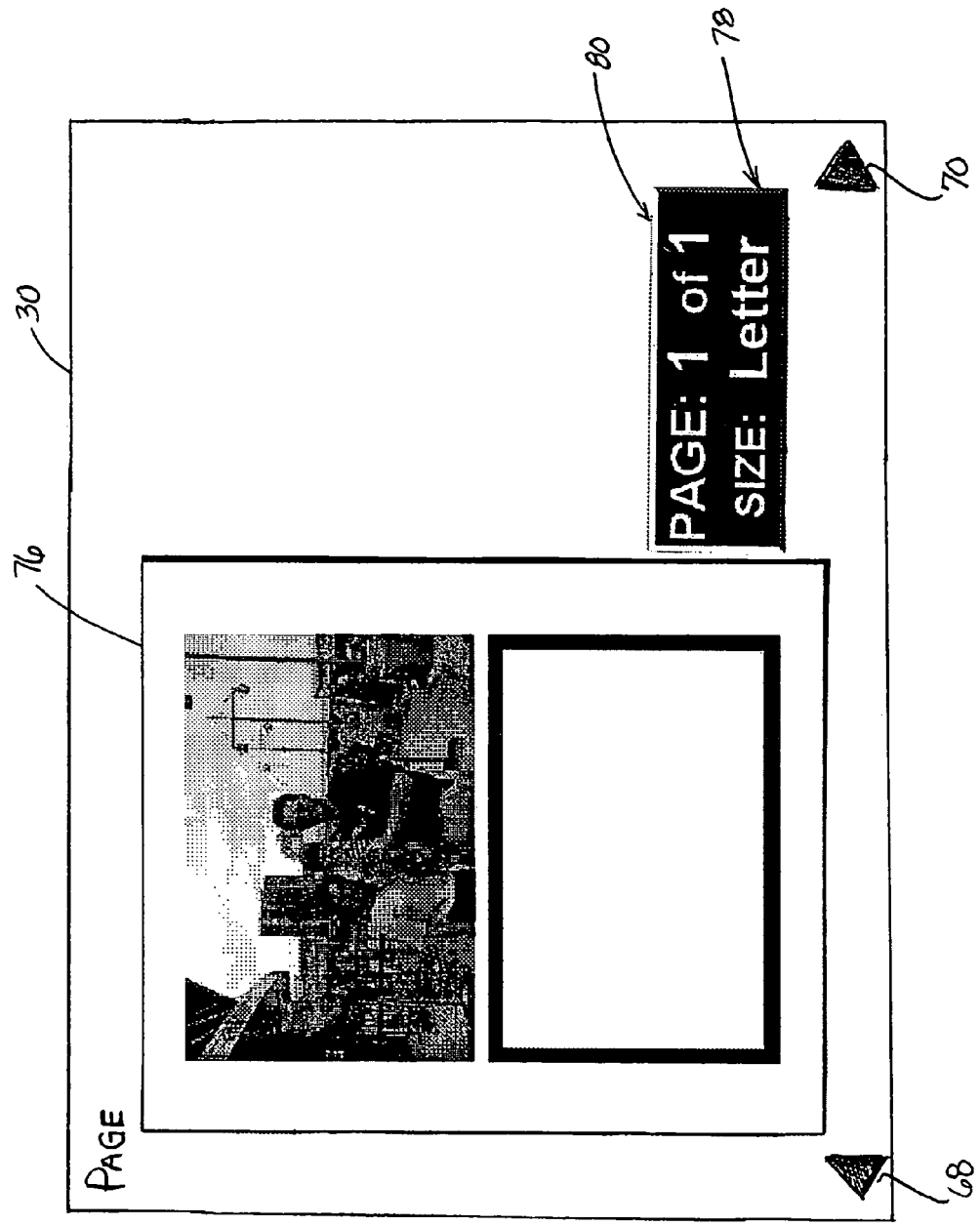
FIG. 7a is an exemplary screen display depicting a second, page view of the user interface of FIG. 5.

FIG. 7a depicts an exemplary screen shown on display 30 when the page view 50 is active. As shown in FIG. 7a, when the page view 50 is active a preview of an output page 76 is shown on display 30, with the digital photographic images arranged on the output page in the manner in which they will be printed. The images are shown on the output page 76 as formatted or modified in the image view 48, and in the order in which the images were selected for printing. To remove an image from the page 76, the view button 38 is pressed twice to cause the image view 48 to be active again, and the images stepped through until the desired image is displayed. Once the image is displayed, the select button 40 may be pressed to remove the image from the page 76. In addition to the page itself, information regarding the page 76 such as, for example, the selected paper size may be depicted on the display 30, as indicated at 78. Left and right arrows 68, 70 are also depicted on the display 30 when additional pages are available for viewing. These additional pages may be stepped through by pressing the appropriate left or right arrow on the rocker switch 46. A number may also be assigned to each of the pages 76, and this number shown on the display 30, as indicated by reference numeral 80.

Figure 7B:
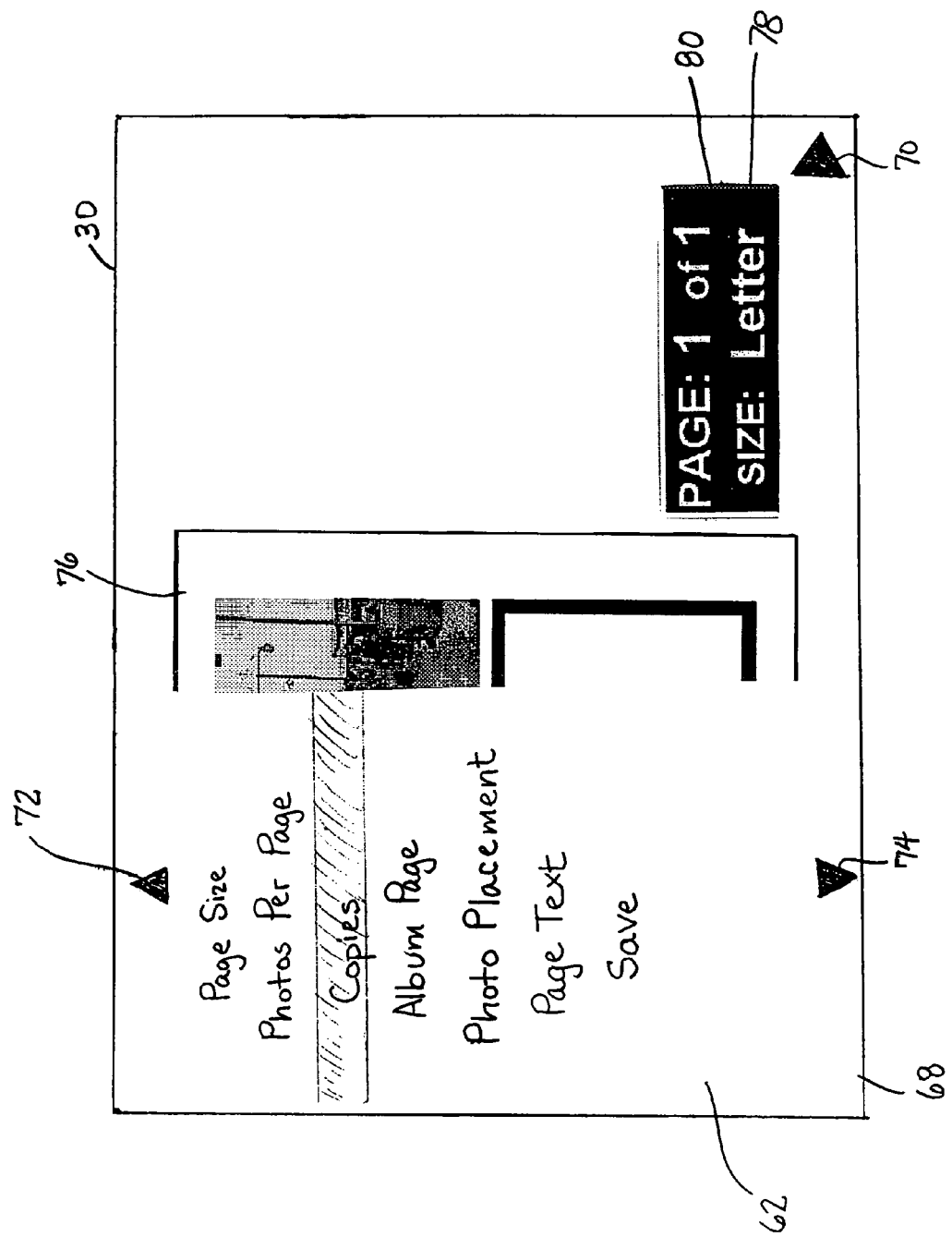
FIG. 7b is an exemplary screen display, similar to FIG. 7a, depicting the page view and accompanying menu.

FIG. 7b depicts an exemplary screen shown on display 30 when the menu button 44 has been pressed while the page view 50 is active. As shown in FIG. 7b, pressing the menu button 44 causes the menu corresponding to the page view 50 to overlay the displayed page. The page view menu 62 may include any number of page settings and formatting options. In the exemplary embodiment shown, the page view menu 62 includes the options: "page size", "photos per page", "copies", "album page", "photo placement" "page text" and "save". These options are only representative of the menu options that may be utilized, with the particular options being determined by the application. Accordingly, the depicted menu options will not be described in greater detail herein. In addition, the options may be changed by software updates to the photoprinter 10, as described above for the image view menu 60. When more menu options are available than can be shown on the display 30 at the same time, up and down arrows 72, 74 are depicted to indicate the additional options. The user may access these additional options by pressing either the up or down arrows on the rocker switch 46. After a menu option has been selected to format or otherwise modify the page 76, the display 30 is immediately updated to reflect the selection and display the modified page. Thus, a user can interactively modify a printed page by selecting a format option and immediately viewing the effect of the selection on the page. The ability to interactively format and preview pages decreases the time required to prepare printed pages, and assures that the pages are correct prior to printing.

Figure 8A:
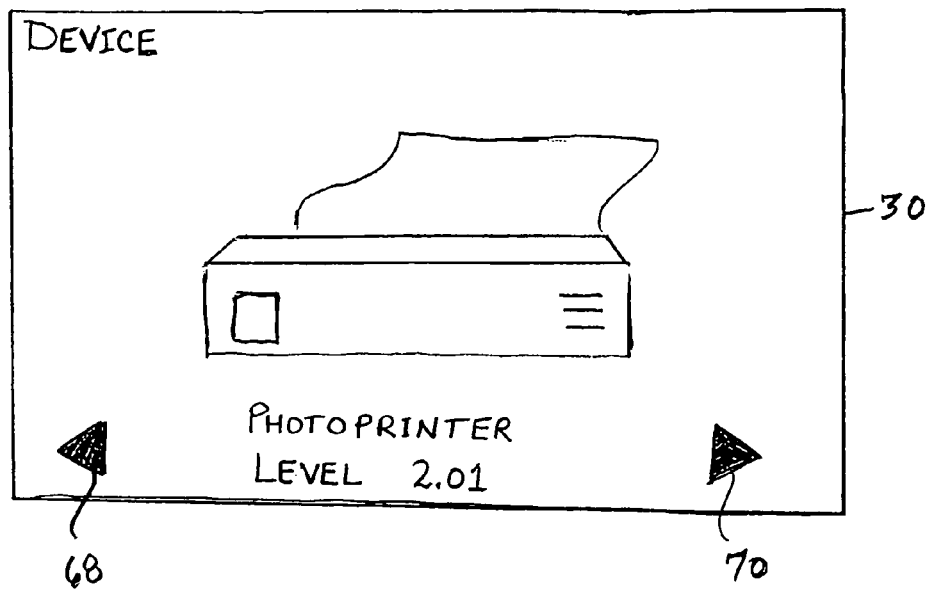
FIG. 8a is an exemplary screen display depicting a third, device view of the user interface of FIG. 5.
Figure 8B:
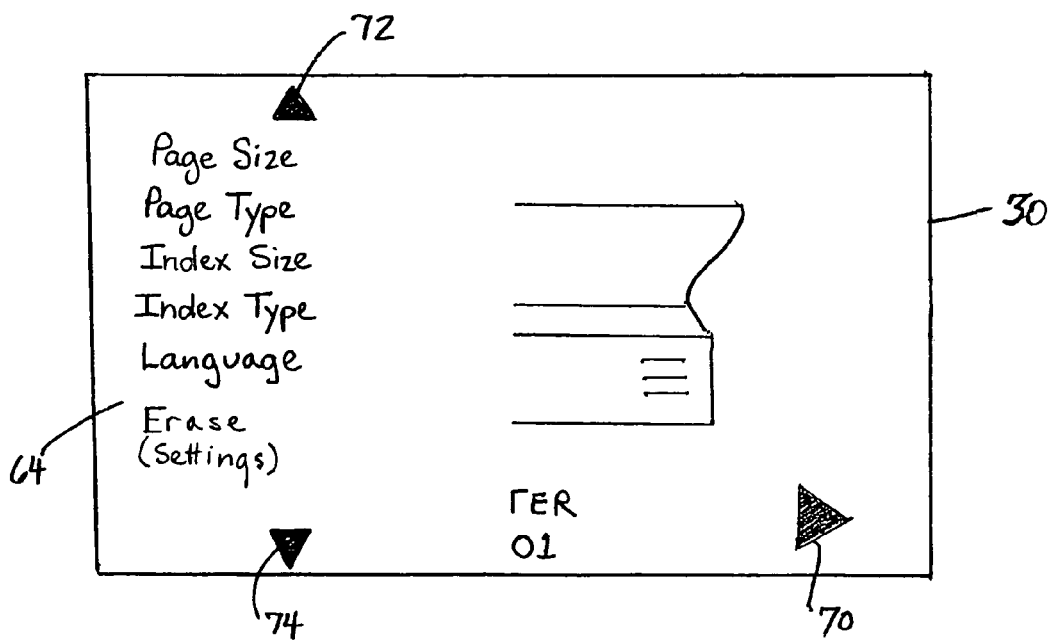
FIG. 8b is an exemplary screen display, similar to FIG. 8a, depicting the device view and accompanying menu.

FIG. 8a depicts an exemplary screen shown on display 30 when the device view 52 is active. As shown in FIG. 8a, when the device view 52 is active a graphical representation of the photoprinter 10 or any attached devices is depicted on display 30. Preferably, one of the devices is depicted at a time, with left and right arrows 68, 70 indicating that additional devices are available for viewing. The devices may be stepped through, as indicated by arrows 68, 70, using the rocker switch 46, and particular parameters set for the devices by pressing the menu button 44 while a device is displayed. The menu button 44 causes a list of menu options pertinent to the particular displayed device to overlay the graphical representation of the device, as shown in FIG. 8*b*. In the exemplary embodiment shown, the device menu 64 for the photoprinter 10 includes the options: "Page Size", "Page Type", "Index Size", "Index Type", "Language", and "Erase". As described above, these options are only representative, and the list of options may be changed by software updates to the photoprinter 10. Further, additional menu options may be indicated by up and down arrows 72, 74. The list of available menu options may vary between the photoprinter 10 and the other optional devices. Thus, each device may have a different list of menu options which would be relevant for setting the operating parameters for that particular device.

Figure 9:
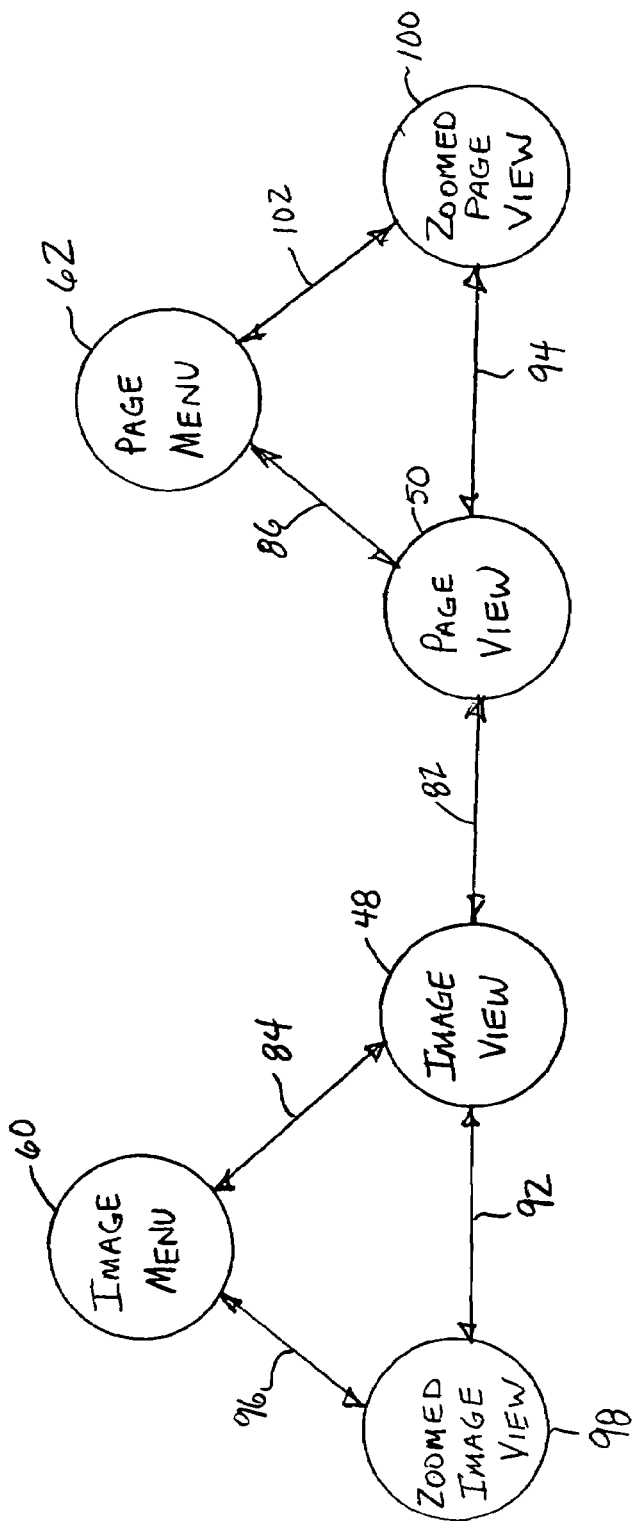
FIG. 9 is a diagrammatic illustration of a second exemplary embodiment for the user interface shown in FIG. 2.

FIG. 9 illustrates a second exemplary embodiment for the user interface 23 of the present invention, in which two separate views are depicted on the display 30 simultaneously in a split-screen format. Depicting both the image and the output page views continuously on the display enables the user to more easily select the correct formatting of the page to get the desired results. In this embodiment, only one of the displayed views is active at a time, and the user may toggle between active views by activating a button on the operator panel 28. In the exemplary embodiment shown, pressing the right arrow on the rocker switch 46 causes the page view 50 to be active, while pressing the left arrow on the rocker switch causes the image view 48 to be active, thus providing for movement between the displayed views as indicated by double arrow 82. However, other activating buttons or alternative selection devices could also be utilized for moving between active views without departing from the scope of the invention.

Figure 10:
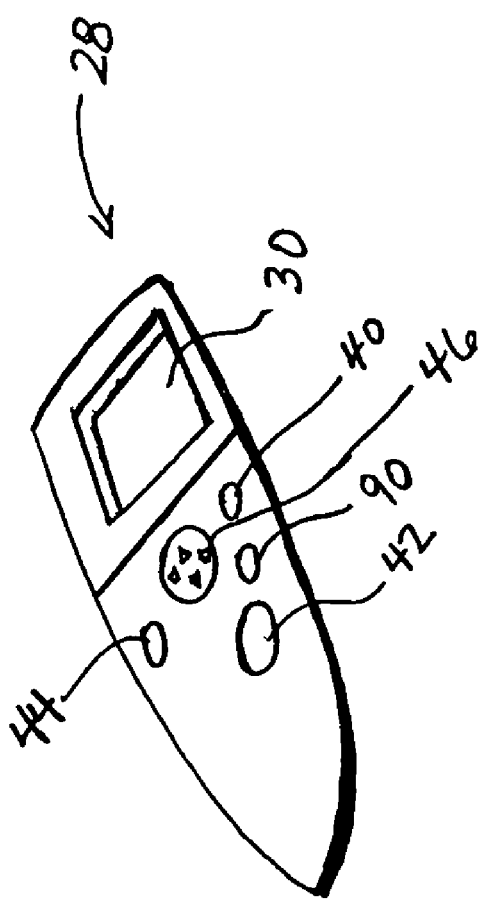
FIG. 10 is an enlarged view of an operator panel for the photoprinter of FIG. 3 for a second exemplary embodiment.

FIG. 10 is an enlarged view of the operator panel 28 of FIG. 3 for the second exemplary embodiment illustrated in FIG. 9. As shown in FIG. 10, in this embodiment the operator panel 28 again includes the "select" button 40, the "print" button 42, the "menu" button 44, and the rocker switch 46, with the function of each of these buttons being substantially the same as in the previous embodiment. In particular, pressing the menu button 44 while the image view is active will cause the image menu 60 to overlay the image on the display 30, as indicated by double arrow 84 in FIG. 9. The options available in the image menu 60 and the selection of these options may be similar to that described with respect to the first embodiment. The image menu 60 may be exited by selecting a highlighted option by pressing the select button 40, or by pressing the menu button 44 again to leave the menu without making any changes to the image. Likewise, when the page view 50 is active, pressing the menu button 44 will cause the page menu 62 to overlay the page depicted on the display 30, as indicated by double arrow 86 in FIG. 9. The options available in the page menu 62 and the selection of these options may be similar to that described with respect to the first embodiment. The page menu 62 may be exited by selecting a highlighted option by pressing the select button 40, or by pressing the menu button 44 again to leave the menu without making any changes to the page 76. In addition to the print, select and menu buttons 40, 42 and 44, in the second embodiment shown in FIGS. 9 and 10 a "zoom" button 90 is provided for conducting sizing operations on the displayed images and pages. As indicated by double arrow 92, pressing the zoom button 90 while the image view 48 is active instructs image processing 22 to cycle through enlarged (zoomed) views 98 of the displayed image. While in a zoomed image view 98, the menu button 44 may be pressed to cause the image menu 60 to overlay the zoomed image, as indicated by double arrow 96.

Options may then be selected from the image menu 60 for formatting or modifying the zoomed image. Following selection of an option from the image menu 60, the zoomed image is updated on the display 30 to reflect the selection. When the image menu 60 is exited, the display 30 is returned to the zoomed image view 98.

Similarly, pressing the zoom button 90 while the page view 50 is active instructs image processing 22 to cycle through zoomed views 100 of the displayed page 76, as indicated by double arrow 94. While in a zoomed page view 100, the menu button 44 on operator panel 28 may be pressed to cause the page menu 62 to overlay the zoomed page display, as indicated by double arrow 102. Options may then be selected from the page menu 62 for formatting or modifying the zoomed page. Following selection of an option from the page menu 62, the display of the zoomed page is updated to reflect the selection. When the page menu 62 is exited, the display 30 is returned to the zoomed page view 100, as indicated by double arrow 102. Preferably, the zoom button 90 causes image processing 22 to cycle through a fixed set of scaling options that can be applied to either the active image or the active page. Additionally, during red-eye fix, the zoom button 90 may cycle through zoomed views of the image so that the red-eye box may be placed accurately.

Figure 11A:
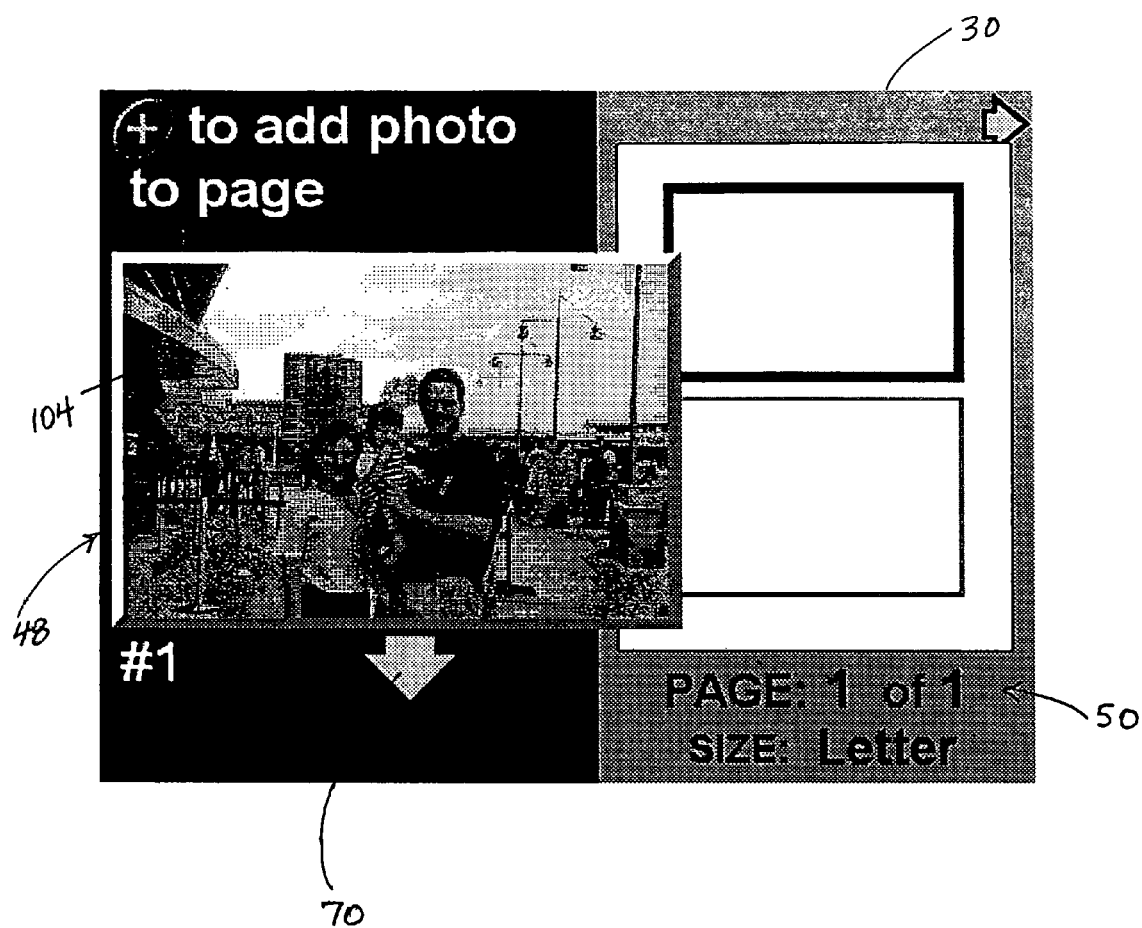
FIG. 11a is an exemplary screen display for the second embodiment of FIG. 9, depicting the image and page views with the image view active.
Figure 11B:
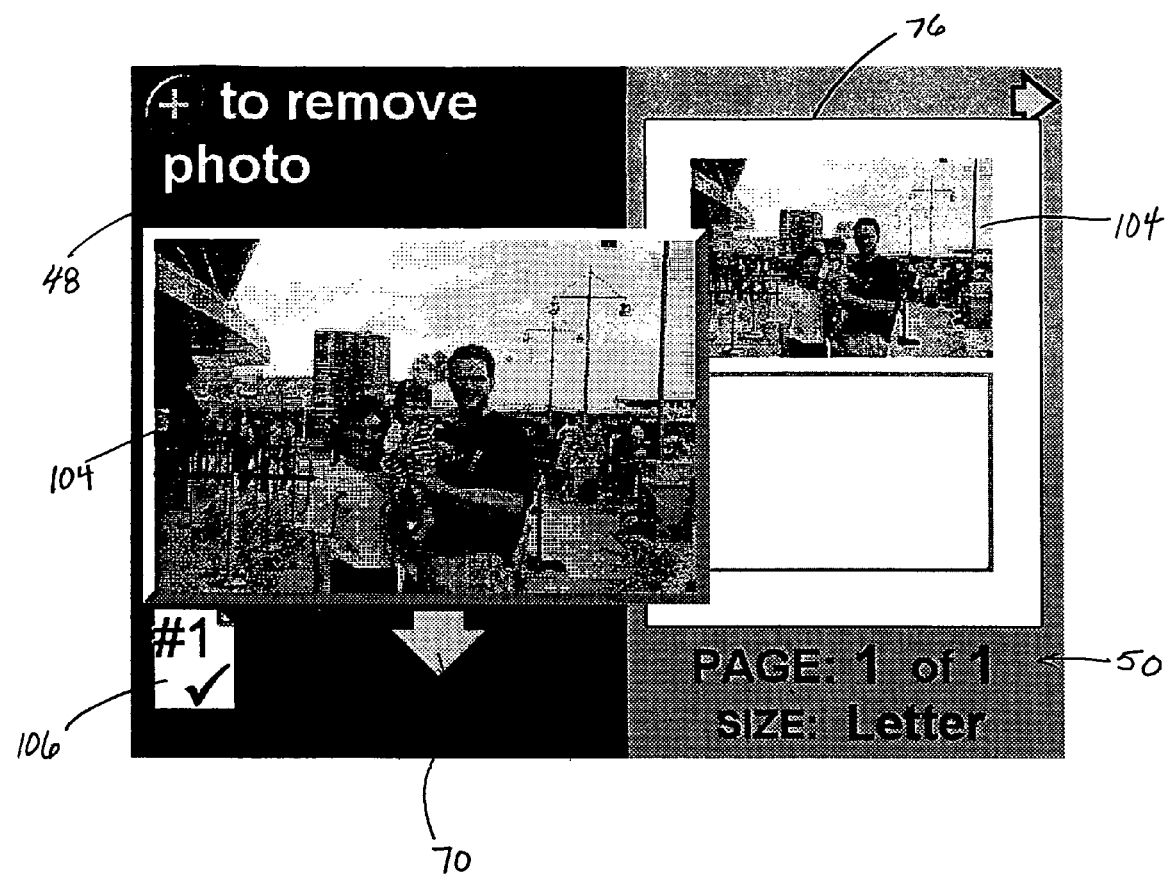
FIG. 11b is an exemplary screen display similar to FIG. 11a, in which an image has been selected and placed on a page.
Figure 12:
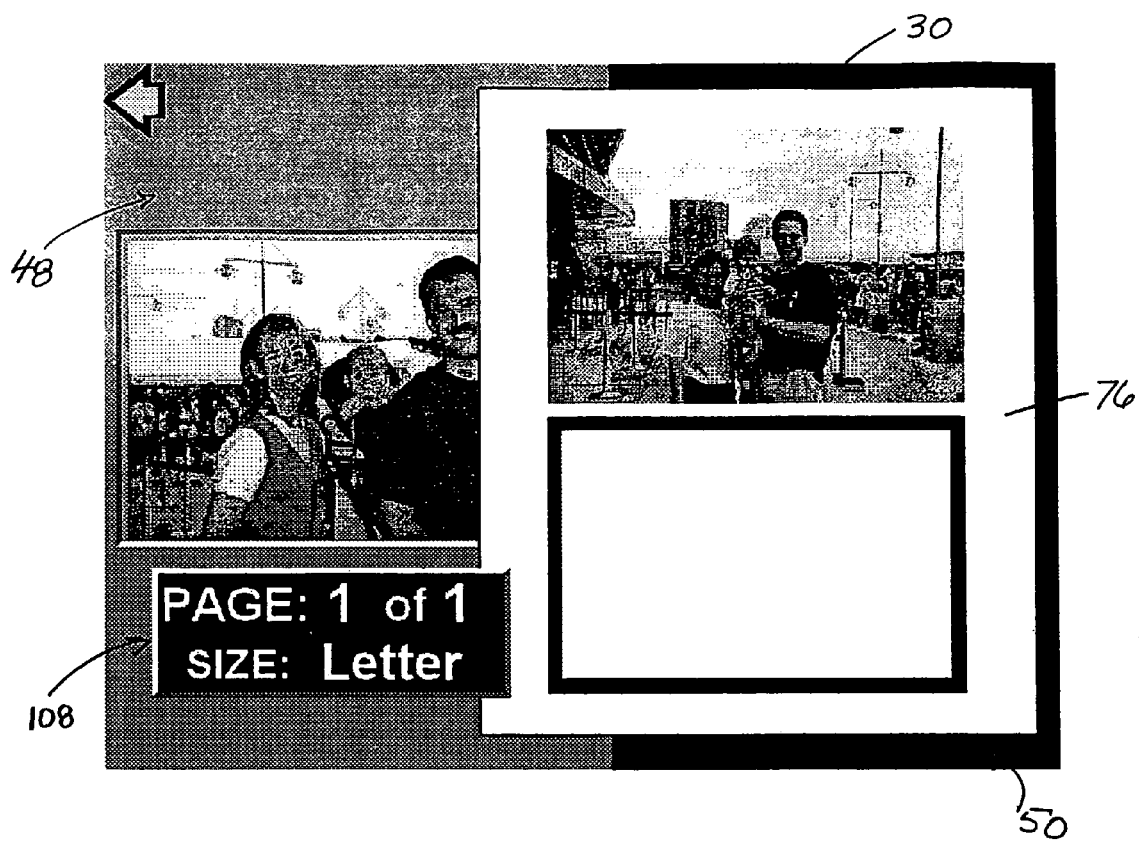
FIG. 12 is an exemplary screen display for the second embodiment of FIG. 9, depicting the image and page views with the page view active.

FIG. 11*a* depicts an exemplary screen display for the second embodiment when the image view 48 is active. As shown in FIG. 11*a*, in this embodiment the image view 48 comprises the left half of display 30, while the page view 50 comprises the right half of the display. The active half of the screen, such as the image view 48 in FIG. 11*a*, slightly overlays the inactive half. In addition, the appearance of the screen halves may vary, such as being of different colors, intensity, etc., in order to indicate which view is active. The arrow 70 indicates that additional images are available for viewing. FIG. 11*b* depicts an exemplary screen display similar to FIG. 11*a*, in which the image 104 displayed on the screen has been added to the page 76. The image may have been added to the page by pressing an activating button on the operator panel 28 or by another appropriate selection device. An indication of this action may be provided to the user such as by the page and check mark 106 in the bottom left corner of the screen. FIG. 12 depicts an exemplary screen display similar to FIGS. 11*a* and 11*b*, in which the active view has been changed from the image view 48 to the page view 50. As shown in FIG. 12, when the page view 50 is active, the displayed page slightly overlays the current image on the display 30. In addition, information about the displayed page may be provided as indicated at 108.

Figure 13:
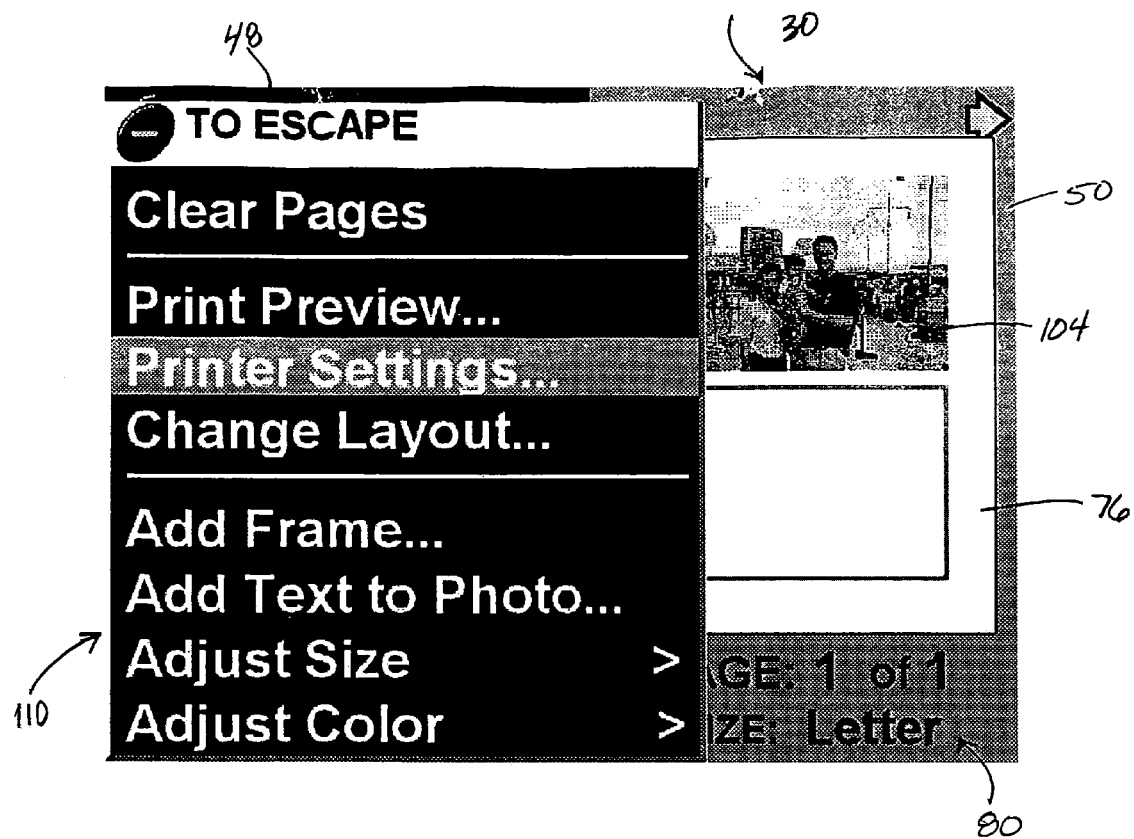
FIG. 13 is an exemplary screen display similar to FIG. 12, depicting the split-screen views and accompanying menu.

FIG. 13 depicts an exemplary screen display similar to FIG. 11*b*, in which the menu button 44 has been activated to cause a menu 110 to overlay the image on display 30. Depending upon the active view, selections may be made from the menu 110 to modify either the image in the image view or the page in the page view. In the exemplary embodiment depicted, the menu 110 includes options applicable to both views, such that the same menu may be utilized when either the image view or the page view is active. However, separate menus for the image and page views may also be utilized, such as depicted schematically in FIG. 9, without departing from the scope of the invention.

The foregoing description of a preferred embodiment of the invention has been presented for purposes of illustration and description. It is not intended to be exhaustive nor to limit the invention to the precise form disclosed. Obvious modifications or variations are possible in light of the above teachings. For example, while the invention has been described with respect to exemplary embodiments in which particular activating buttons on an operator panel are utilized for interacting with the user interface, alternative selection methods such as a touchscreen or mouse, or alternative forms of an operator panel could also be utilized to achieve the desired results. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A stand-alone printing apparatus for transferring one or more digital photographs captured by a digital device to a printable medium, said printing apparatus comprising:
   an input member for receiving said one or more digital photographs from a source;
   an image processor for generating an image corresponding to each digital photograph;
   an integrated graphical user interface with a video display for displaying said images and for selecting one or more of said digital photographs for a printed page;
   at least one drive for receiving a computer readable medium, wherein said source is a computer readable medium disposed in said drive; and
a print control for producing on said printable medium a pattern associated with said printed page;
   wherein said user interface further comprises an operator panel having a plurality of activating members for initiating instructions to the user interface, and wherein said video display is located on said operator panel;
   wherein said user interface further comprises a plurality of different states, and wherein said video display varies between said different states;
   wherein said different states comprise: an image view in which an image is depicted on said display, and a page view in which a page is depicted on said display; and
   wherein activation of said print button in said image view instructs said print control to produce a pattern on said printable medium corresponding to an image on said video display.

2. A stand-alone printing apparatus for transferring one or more digital photographs captured by a digital device to a printable medium, said printing apparatus comprising:
   an input member for receiving said one or more digital photographs from a source;
   an image processor for generating an image corresponding to each digital photograph;
   an integrated graphical user interface with a video display for displaying said images and for selecting one or more of said digital photographs for a printed page;
   at least one drive for receiving a computer readable medium, wherein said source is a computer readable medium disposed in said drive; and
a print control for producing on said printable medium a pattern associated with said printed page;
   wherein said user interface further comprises an operator panel having a plurality of activating members for initiating instructions to the user interface, and wherein said video display is located on said operator panel;
   wherein said user interface further comprises a plurality of different states, and wherein said video display varies between said different states;
wherein said different state comprise: an image view in which an image is depicted on said display, and a page view in which a page is depicted on said display; and
   wherein said different states further comprise a device view in which a representation of said printing apparatus and any attached devices is depicted on said video display.

3. A graphical user interface for a stand-alone photoprinter capable of transferring a digital photograph from a source to a printable medium, said user interface comprising:
   a video display integrated within said photoprinter for graphically depicting an image corresponding to said digital photograph;
   a plurality of activating members for initiating user instructions to said user interface; and
   a plurality of different states in which to depict information on said video display, one of said states being active at a time, said user interface moving between active states in response to activation of one or more of said activating members.

4. The graphical user interface of claim 3, wherein said different states comprise an image view in which an image corresponding to a digital photograph is depicted on said video display, and a page view in which a page comprised of selected images is depicted on said video display.

5. The graphical user interface of claim 4, wherein said different states further comprise a device view in which a graphical representation of said photoprinter and any attached devices is depicted on said video display.

6. The graphical user interface of claim 4, wherein said user interface further comprises formatting options for formatting said digital photograph, and wherein said user interface formats said digital photograph in response to user instructions and updates said image on said video display with a formatted image.

7. The graphical user interface of claim 4, wherein said page view is comprised of digital photographs selected in said image view.

8. The graphical user interface of claim 7, wherein said image view and said page view are shown simultaneously on said video display, and wherein the active state varies between said image view and said page view by activating one of said activating members.

9. A method for previewing and printing digital photographs on a stand-alone photoprinter comprising the steps of:
   receiving said digital photographs from a digital photograph source, wherein the digital photograph source is a computer readable medium disposed in a drive integrated within said photoprinter;
   generating an image for each of said digital photographs in an image processing member;
   providing a user interface having a video display integrated within said photoprinter;
   activating an image view in said user interface to display said images on said video display;
   selecting from amongst said displayed images to form a printed page;
   activating a page view in said user interface to preview said printed page on said video display; and
   instructing a print control in said photoprinter to produce a pattern associated with said printed page on a print medium.

10. The method of claim 9, further comprising the steps of formatting an image in response to user instructions to said user interface, and updating said display in said image view to depict said formatted image.

11. The method of claim 9, further comprising the steps of formatting a printed page in response to user instructions to said user interface, and updating said preview of said printed page in said page view to depict said formatted printed page.

12. The method of claim 9, further comprising the step of moving between said image view and said page view using one or more activating members of said user interface.

13. The method of claim 9, further comprising the step of instructing said print control to produce a pattern associated with an image displayed in said image view in response to activation of an activating member on said user interface.

* * * * *